US010414125B2

(12) United States Patent
Resch et al.

(10) Patent No.: US 10,414,125 B2
(45) Date of Patent: Sep. 17, 2019

(54) MULTI-PLY COMPOSITE MATERIAL

(71) Applicant: Constantia Teich GmbH, Weinburg (AT)

(72) Inventors: Helmut Resch, Rabenstein (AT); Jasmin Teubenbacher, Weinburg (AT); Martin Kornfeld, Klosterneuburg (AT); Adolf Schedl, Lilienfeld (AT); Robert Kitzberger, Traismauer (AT)

(73) Assignee: Constantia Teich GmbH, Weinburg (AT)

( * ) Notice: Subject to any disclaimer, the term of this patent is extended or adjusted under 35 U.S.C. 154(b) by 0 days.

(21) Appl. No.: 15/765,651

(22) PCT Filed: Oct. 5, 2016

(86) PCT No.: PCT/EP2016/073799
§ 371 (c)(1),
(2) Date: Apr. 3, 2018

(87) PCT Pub. No.: WO2017/060305
PCT Pub. Date: Apr. 13, 2017

(65) Prior Publication Data
US 2018/0297325 A1 Oct. 18, 2018

(30) Foreign Application Priority Data
Oct. 9, 2015 (EP) .................................... 15189126

(51) Int. Cl.
| | |
|---|---|
| *B32B 7/12* | (2006.01) |
| *B32B 37/12* | (2006.01) |
| *B32B 15/20* | (2006.01) |
| *B32B 27/06* | (2006.01) |
| *B32B 29/00* | (2006.01) |
| *B32B 15/01* | (2006.01) |
| *B32B 15/08* | (2006.01) |
| *B32B 15/12* | (2006.01) |
| *B32B 27/10* | (2006.01) |
| *C09J 123/08* | (2006.01) |
| *C09J 153/02* | (2006.01) |
| *C09J 153/00* | (2006.01) |
| *B31B 105/00* | (2017.01) |

(52) U.S. Cl.
CPC .............. *B32B 7/12* (2013.01); *B32B 15/016* (2013.01); *B32B 15/08* (2013.01); *B32B 15/12* (2013.01); *B32B 15/20* (2013.01); *B32B 27/10* (2013.01); *B32B 37/12* (2013.01); *B31B 2105/001* (2017.08); *B32B 2037/1269* (2013.01); *B32B 2553/00* (2013.01); *C09J 123/0869* (2013.01); *C09J 153/005* (2013.01); *C09J 153/02* (2013.01)

(58) Field of Classification Search
CPC .. C09J 123/0869; C09J 153/02; C09J 153/05; C09J 153/005; B32B 7/12; B32B 15/016; B32B 15/08; B32B 15/12; B32B 15/20; B32B 27/08; B32B 27/10; B32B 29/005
See application file for complete search history.

(56) References Cited

U.S. PATENT DOCUMENTS

| | | | |
|---|---|---|---|
| 2002/0015542 A1 | 2/2002 | Bradley | |
| 2003/0190466 A1* | 10/2003 | Nakaba | ..................... B32B 7/10 428/344 |
| 2011/0318552 A1 | 12/2011 | Johnson | |
| 2013/0196120 A1 | 8/2013 | Gray et al. | |
| 2013/0206630 A1 | 8/2013 | Burmeister | |

FOREIGN PATENT DOCUMENTS

| | | |
|---|---|---|
| DE | 1093029 B | 11/1960 |
| EP | 2316642 A1 | 5/2011 |
| WO | 2013123230 A1 | 8/2013 |

OTHER PUBLICATIONS

International Preliminary Report on Patentability Application No. PCT/EP2016/073799 dated Oct. 17, 2017 5 Pages.
International Search Report & Written Opinion of the International Searching Authority Application No. PCT/EP2016/073799 Completed: Dec. 14, 2016; dated Jan. 20, 2017 11 Pages.

* cited by examiner

*Primary Examiner* — Ramsey Zacharia
(74) *Attorney, Agent, or Firm* — Whitmyer IP Group LLC

(57) ABSTRACT

In order to be able to set the bending stiffness of a composite material having at least two plies connected by a laminating agent, it is provided that a mixture of a first, curing adhesive and a second, non-curing adhesive is used as laminating agent, wherein the bending stiffness of the composite material is set by the mixing ratio of the two adhesives.

7 Claims, 1 Drawing Sheet

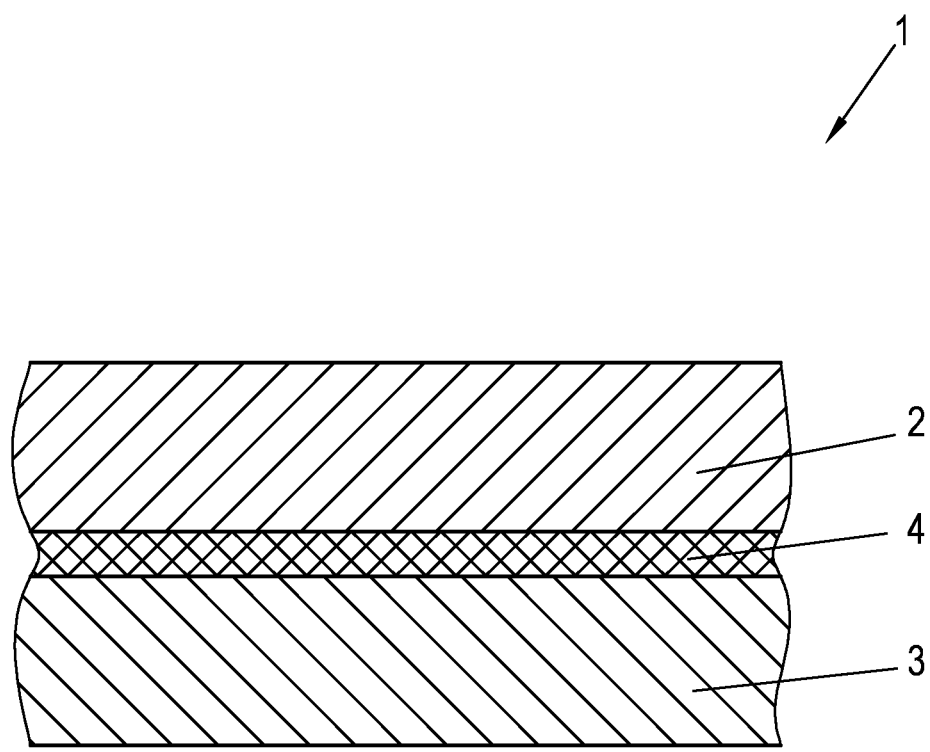

MULTI-PLY COMPOSITE MATERIAL

TECHNICAL FIELD

The present teaching relates to a multi-ply composite material, wherein at least a first ply and a second ply are connected to one another by a laminating agent, and also to a method for production of such a material.

BACKGROUND

In the packaging industry multi-ply composites are often used as packaging materials. By way of example, and not exhaustively, mention may be made here of composites in the form of aluminum/paper, aluminum/aluminum, aluminum/plastic or aluminum/paper/aluminum. The individual plies of the composite are connected to one another in this case by lamination. For this purpose, a connecting layer or a laminating layer is applied between the individual plies of the composite that connects or glues the two plies inseparably to one another. In this case "inseparably" means that the connected layers can no longer be separated non-destructively after the lamination. In the packaging industry for food products the materials for the laminating layer must, of course, be food-safe and must be harmless for consumers. Although the laminating agent does not come directly into contact with the packaged material, contact may still occur due to diffusion processes, either of the packaged material and/or of the laminating agent, and for this reason it is indispensable that in the packaging industry for food products the laminating agent is physiologically harmless.

According to the current prior art in the packaging industry for food products, primarily for wraparound packing, among others, synthetic waxes are used as laminating agents which satisfy these prerequisites and of which a number are commercially available on the market. In such applications the synthetic wax is applied as laminating agent, typically with a thickness of 5-50 g/m$^2$.

Synthetic waxes are obtained from petroleum and always contain certain residues of refining constituents. Although these residues are food-safe, they are perceived to some extent subjectively by the consumer. If a food product, for example chocolate, is packaged, for example wrapped, in a multi-ply packaging material with a wax as laminating agent, from the perspective of a consumer this can lead to an impairment of the taste or smell of the packaged food product. Therefore, alternatives for such synthetic waxes are increasingly sought.

Possible alternatives for synthetic wax are adhesives, of which there are likewise some which are food-safe. In principle it is possible to distinguish between curing and non-curing adhesives.

Curing adhesives are physically or chemically setting adhesives. Therefore curing adhesives react after the application either by radiation, such as UV light, normal light, etc., temperature or moisture, which can also be absorbed by means of the air, by evaporation of an aqueous phase (water, solvent), or in another way, for example by a chemical reaction, as is typical in the case of multi-component adhesives. After curing, the adhesive achieves its final properties, such as strength, bond strength (adhesion, cohesion), rigidity, etc., but after curing, the adhesive is no longer sticky. Therefore, once cured, an adhesive cannot be used again. A non-curing adhesive is an adhesive without a curing mechanism and is consequently permanently sticky (or constantly sticky), i.e. a non-curing adhesive does not lose its stickiness. The significant distinguishing characteristic is the chain length of the molecule chains of the adhesive. In a non-curing adhesive the molecule chains are also sufficiently short after drying, so that the adhesive remains constantly sticky. On the other hand, a curing adhesive has long or longer molecule chains, which take away the stickiness of the adhesive after curing. However, it should be noted that the differentiation into curing and non-curing adhesive says nothing with regard to the bonding characteristics (adhesion, cohesion) of the adhesive. In both groups there are more or less strongly and weakly bonding adhesives.

Whether or not an adhesive is a curing or non-curing adhesive is usually apparent from the manufacturers specifications for the adhesive, for example from data sheets, manufacturers information, etc. This is also known for common adhesives. In case of doubt, it could also be ascertained by simple tests.

Both types of adhesive are typically applied wet. For this purpose, the adhesive is applied in a wet phase, either in water or a suitable solvent, and is then dried.

The adhesives which can be used in the food industry have varied characteristics and are therefore used for varied applications. So-called pressure-sensitive adhesives (PSA), often also designated as contact adhesives, exhibit the adhesive effect by simple pressure. A contact adhesive is a typical example of a non-curing adhesive. Such adhesives are known in particular from applications such as adhesive strips. Mixtures are often also used in such applications as adhesive materials. These contact adhesives also differ with regard to their bonding characteristics (stickiness), which can be specified as peel strength (as resistance against peeling off from the substrate to which the adhesive is applied).

Removable adhesives (having a low peel strength), generally likewise in the form of PSA, can be removed again after application and usually applied once more. Such removable adhesives are used, for example, if reclosing of the package after opening is required. In a composite material for a package, it is easy to see that such removable adhesives are unusable, since the composite material in the package should not be capable of being parted between the material layers.

In the case of a removable adhesive, after the first opening a residual stickiness remains, which makes it possible to reclose the package. Removable adhesives should enable a cohesion failure, wherein the adhesive is exposed in the event of opening on both layers. In this case the removable adhesive naturally should not bring about a connection which is too strong between the material layers, in order to enable easy loosening for opening. However, this does not function with every material. Reclosure in the case of a composite of paper with another material, such as for example aluminum or plastic, does not work with a removable adhesive because, due to the tearing of fibers of the paper, with the fibers remaining adhered to the adhesive, the stickiness of the removable adhesive is lost and reclosure is no longer possible.

Thus although, because of their food-safe characteristics, some adhesives are suitable in principle for use in a package for food products, not all adhesives can be used for all material combinations in the multi-ply composite material.

DE 1 093 029 A describes a permanently adhesive, pressure-sensitive, removable adhesive material consisting of a mixture of a synthetic rubber, such as for example styrene butadiene, with a polymer containing polyacrylate. The aim of the adhesive mixture is to achieve a good sound-absorbing effect, for which the proportion of synthetic rubber should be greater. Accordingly, a very thick layer of the adhesive is also provided—a dry weight of the adhesive layers of 147 g/dm² is mentioned, which corresponds to a layer thickness in the centimeter range.

WO 2013/123230 A1 describes different mixtures of adhesives, also pressure-sensitive ones, which are suitable for sealing and also for lamination of nonwoven fabrics, paper or films. However, no further details are given with regard to the characteristics of the adhesive mixtures contained.

In the packaging industry, in particular for food products, apart from the suitability of the adhesive in principle for the food industry, there is also a further problem. The manufacturers of the food product often wish the package to have a specific bending stiffness, and often the term limpness is used. In this case limpness is understood as substantially the converse of the bending stiffness of the packaging material, i.e. the stiffer the material the lower the limpness, and vice versa, whereas there does not have to be a linear correlation. The bending stiffness is perceived by a consumer subjectively with the hands and ranges from a soft, very flexible material up to a very stiff material.

In the past, because of the variety of synthetic waxes, it has been easy to find a wax as laminating agent which has provided, at least approximately, the required bending stiffness in a specific composite. When adhesives are used as laminating agents this is now no longer the case, since because of the basic characteristics of the adhesive, in particular also because of the material-induced restriction, a flexible adaptation of the bending stiffness in the range required for the food industry is possible only with difficulty or is not even possible at all. In this case the basic problem is that conventional adhesives used in the packaging industry for food products are usually too stiff, so that the package thus produced is likewise too stiff.

SUMMARY

Therefore, an object of the present teaching is to provide a multi-ply packaging material having a first layer and a second layer connected thereto, wherein the bending stiffness of the packaging material can be set within a wide range. A further object is to provide a production method for such a multi-ply packaging material.

This object is achieved according to the present teaching in that a mixture of a first, curing adhesive and a second, non-curing adhesive is provided as laminating agent, wherein a required bending stiffness of the composite material in the range from 50 to 100 mN in the longitudinal direction of the composite material and from 90 to 120 mN in the transverse direction of the composite material is set by the mixing ratio of the two adhesives, wherein the bending stiffness of the composite material declines, the more second, non-curing adhesive is added. By the use of such a mixture as laminating agent, the bending stiffness of the composite material can be set and in particular can be adapted to the requirements of the respective use of the composite material. Apart from this, the laminating agent according to the present teaching makes it possible to use adhesives in laminating processes which in the past were not suitable therefor or only suitable to a limited extent. Thus the composite material can be produced in a substantially more flexible and varied manner. Not least, due to the laminating agent according to the present teaching, by comparison with the previous synthetic waxes, significant savings are made on material, which also makes the composite material according to the present teaching, or the production method, more ecological, but also more favorable.

Depending upon the application and structure of the composite material, the mixing ratio can vary within a wide range, without negatively restricting the suitability of the composite material as packaging material or the production method.

Thus, last but not least, composite materials can be produced from plies with the most varied materials, in particular paper, aluminum or plastic.

BRIEF DESCRIPTION OF THE DRAWINGS

The present teaching is explained in greater detail below with reference to FIG. 1, which shows an advantageous embodiment of the present teaching by way of example, schematically and without limitation.

FIG. 1 shows a multi-ply composite material having two laminated plies.

DETAILED DESCRIPTION

A multi-ply, in this case two-ply, composite material 1 is illustrated in FIG. 1. In this case the unprocessed composite material 1 is usually rolled up with a certain width on a roll and is processed, for example cut, from the roll and is fed to a packaging machine. The composite material 1 consists of a first ply 2 and a second ply 3, wherein the two plies 2, 3 are connected to one another by means of a laminating layer 4. The first ply 2 and second ply 3 are preferably made of aluminum, paper or a plastic, or a combination of these materials in the form of a laminate. The lamination of two plies 2, 3 is a well-known process. A distinction is made in principle between a wet lamination and a dry lamination. In both cases the laminating agent in liquid form is applied to at least one of the two plies 2, 3, for example by rolling on, spraying on, etc.

In the case of dry lamination, the applied laminating agent is then dried and then the two plies 2, 3 are joined (laminated) by being pressed against one another. Thus, dry lamination requires that, after drying, the laminating agent is either constantly sticky (non-curing adhesive) or is still sufficiently sticky because the curing adhesive is not yet completely cured.

In the case of wet lamination, on the other hand, the lamination is carried out in the wet state, i.e. the two plies 2, 3 are pressed against one another while the laminating agent is still wet. Only after this is the produced composite dried. Thus, however, the handling of the laminated composite material 1 is more difficult, since the bonding characteristics of the adhesive are only set after drying, whereby the two plies 2, 3 can still move relative to each other between the lamination and the completion of the drying operation. Both non-curing and also curing adhesives can be used as laminating agents for wet lamination. With wet lamination it is also important that the liquid phase (water, solvent) can be removed during the drying operation. Thus the water or solvent must be able to diffuse through one of the two plies 2, 3 during the drying operation, since otherwise bubbles can form on the surface of the composite material 1, which would make the composite material 1 unusable. This means that at least one of the two plies 2, 3 must consist of paper which is open to diffusion. Thus, in wet lamination the possible material combination is restricted.

After the lamination it should no longer be possible for the two laminated plies 2, 3 to be parted from one another without destruction of the composite material 1.

Instead of a two-ply composite material 1, naturally a composite material 1 having more than two plies 2, 3 can also be provided, wherein at least one first ply 2 is laminated according to the present teaching with an adjacent second ply 3, as described below. Furthermore, it may be noted that a ply 2, 3 itself could again be a laminate, for example consisting of aluminum, paper and/or plastic.

The thicknesses of the first and second ply 2, 3 of the composite material 1 can vary within a wide range, depending upon the purpose for which they are to be used. Instead of a thickness, equally a grammage of a ply 2, 3 is also often given in $g/m^2$, from which the thickness of the ply 2, 3 follows. Typical ply thicknesses in the packaging industry for food products are, for example, from 6 μm to 50 μm for aluminum, from 18 $g/m^2$ to 50 $g/m^2$ for paper, and from 5 μm to 50 μm for plastic.

As a paper layer for packages in the food industry, use is frequently made of a so-called laminating silk having a grammage from 20 to 30 $g/m^2$, a greaseproof paper in the form of parchment or parchment substitute, a so-called kraft paper having a grammage von>30 $g/m^2$ or also a so-called coated paper having a coating, generally on the surface facing away from the lamination side.

According to the present teaching, a mixture of a first curing adhesive and a second non-curing adhesive, which naturally must both be food safe, is used as laminating agent for the laminating layer 4.

For use in the packaging industry, the laminating agent according to the present teaching is applied with layer thicknesses in the range from 0.5 $g/m^2$ to 8 $g/m^2$. Thus, by comparison with synthetic waxes, substantially less laminating agent is required, which is particularly advantageous for ecological reasons, but also brings with it a considerable cost advantage.

Adhesives based on thermoplastic elastomers, for example adhesives based on polyolefin, adhesives as styrene block copolymers or as ethylene vinylacetate (EVA) copolymers, can be used as the first curing adhesive. Examples of such adhesives are adhesives containing styrene butadiene or ethylene vinylacetate (EVA) copolymers having a vinyl acetate content of up to 28%. Likewise, thermoplastics may be considered, for example adhesives containing polyacrylate or ethylene copolymerisates, such as for example ethylene acrylic acid (EAA).

The first adhesive is usually present in liquid form, for example as a solution, emulsion or dispersion of the first adhesive in a liquid phase, for example water or a suitable liquid solvent. The first adhesive may be a single-component adhesive, but it may also be a multi-component adhesive.

Adhesives based on thermoplastic elastomers, for example adhesives based on polyolefin, adhesives as styrene block copolymers or as ethylene vinylacetate (EVA) copolymers, can be used as the second non-curing adhesive. Examples of such adhesives are adhesives containing styrene butadiene or ethylene vinylacetate (EVA) copolymers having a vinyl acetate content of up to 28%. In particular, a contact adhesive or pressure-sensitive adhesive can be used as the second non-curing adhesive. Common pressure-sensitive adhesives are adhesives containing polyacrylate or styrene butadiene of low molecular weight.

The second adhesive is also usually present in liquid form, for example as a solution, emulsion or dispersion of the second adhesive in a liquid phase, for example water or a suitable liquid solvent.

A adhesive containing styrene butadiene is understood in particular to be an adhesive containing 60% to 80% (proportion by weight) of styrene butadiene. An adhesive containing polyacrylate is understood according to the present teaching to be an adhesive containing 50% to 90% (proportion by weight) of polyacrylate. These proportions are not based on the dispersion, but relate to the solids content of the adhesives.

Consequently, the mixture of the two adhesives is likewise present in liquid form, wherein the liquid phases of the two adhesives must of course be compatible. The same liquid phase, for example water or the same solvent, is preferably used for both adhesives. For processing, additional water can be added to the mixture of the two adhesives. Likewise, suitable additives, for example stabilisers (maximum 2%), fillers (maximum 10%) and/or anti-foaming agents (maximum 1%), can also be added to the mixture in small amounts, typically a total of at most 10% in relation to the weight of the liquid mixture.

The first, curing adhesive provides a specific bending stiffness (limpness) in the dry state at the usage temperature. However, for many packaging solutions in the food industry the bending stiffness of the composite material 1 achieved in this way is too high. In order to set the bending stiffness to a required value, the second, non-curing adhesive is added to the first, curing adhesive. The bending stiffness of the composite material 1 is set by the second, non-curing adhesive. Thus, this exploits the characteristic of non-curing adhesives that in the dry state they only have a very low bending stiffness.

Naturally, all layers of the composite material 1 participate in the bending stiffness of the composite material 1. With a given layer structure (number of plies, material of the plies, thicknesses of the plies, thickness of the laminating layer 4) of the composite material 1, it is now possible to influence the bending stiffness by means of the laminating agent.

In this case according to the present teaching the mixing ratio M of the first, curing adhesive and the second, non-curing adhesive in the laminating agent can vary within a very wide range, depending upon the application and the material selection. In this case mixing ratios M between the two adhesives in the range from 10% of first, curing adhesive to 90% of second, non-curing adhesive up to 90% of first, curing adhesive to 10% of second, non-curing adhesive are possible. The mixing ratio M is based on the solids content of the adhesives.

Both bonding adhesives are usually processed individually in liquid form, either by dry lamination or wet lamination. It was already surprising here that the mixture of the two adhesives is also sufficiently stable (no sedimentation, segregation, separation of the different phases) to be able to be used in an industrial production process. After the application of the adhesive the liquid is evaporated by heating and the dried adhesive layer remains. Whilst a non-curing adhesive remains sticky on the surface after drying, a curing adhesive forms a dry, non-sticky surface after drying. Because of these very different basic characteristics of the two adhesives, it was also surprising that a mixture of these two adhesives produces a functioning laminating agent and that the processing in an industrial production process is possible. On the contrary, however, it was found that precisely these different characteristics of the two adhesives make the mixture particularly interesting.

The laminating agent according to the present teaching, as a mixture of a first, curing adhesive and of a second, non-curing bonding adhesive, can be processed both in a dry lamination process and also in a wet lamination process. This assists the dry lamination process since, due to the amount of the second, non-curing adhesive, the dried laminating agent layer is sufficiently sticky for laminating the two plies 2, 3. But also a wet lamination process is assisted by the laminating agent according to the present teaching. Until the completion of the drying process, the bonding characteristics of the curing adhesive may possibly still be insufficient, and for this reason the composite material 1, which is not yet dry but is already laminated, is difficult to handle, since the two plies 2, 3 can still move with respect to each other. The amount of second, non-curing adhesive now ensures that, even in the wet state, a sufficient adhesion between the two plies 2, 3 is set in order to prevent movement of the two plies 2, 3 with respect to each other.

An adhesive layer consisting of a non-curing adhesive is soft and has a low bending stiffness. In contrast, an adhesive layer consisting of a curing adhesive is relatively stiff and inflexible. The mixture of the two adhesives additionally enables the setting of the required bending stiffness of the composite material 1.

Therefore the surprising discoveries which are most significant for the present teaching were that the mixture functions outstandingly in a wide mixing ratio as laminating agent, both in a dry lamination process and also in a wet lamination process, and that it is possible, by means of the mixing ratio, to set the bending stiffness of the multi-ply composite material 1, which itself may be present in varied embodiments, according to predetermined requirements without influencing the bonding of the two plies in the composite material 1. This means in particular that the composite material 1 can no longer be separated non-destructively after the lamination. The setting of the bending stiffness also functions for the aforementioned materials in the specified material thickness ranges.

The bending stiffness of the composite material 1 is determined on the basis of the standard DIN 53121, either in the two-point process described therein or in the four-point process described therein. The bending stiffness B can equally be given either as a specific bending stiffness $B_S$ in Nm or as a bending force $B_F$ in N.

The procedure for determining the bending stiffness of the composite material 1 is described using the example of a two-point measurement. At a specific distance I from a rotatable clamp, a one-sided clamped sample of the composite material 1 is stressed by a bending force F acting perpendicularly to the sample surface until a predetermined bending angle α of the sample is achieved. In doing so the rate of deformation until the bending angle α is reached is kept constant. The maximum resistance by which the sample opposes this bending is measured as the bending stiffness. Basically the bending force $B_F$ necessary in order to bend the sample by a bending angle α is measured. From this it is then possible, from the relation $$B_S = \frac{60}{\pi} \frac{B_F l^2}{\alpha b},$$

to make a conversion to the specific bending stiffness $B_S$. A bending angle α of 10°, a sample width b of 15 mm, and a distance I of 1 mm from the clamp to the force application, are set, for example, as measurement conditions. Measuring devices for determining the bending stiffness B are commercially available, for example from Lorentzen & Wettre.

The bending stiffness B can also be determined separately in the two surface directions of the composite material 1, in the longitudinal direction and the transverse direction. The unrolling direction of the composite material 1 from a roller is, for example, regarded as the longitudinal direction, and the direction rotated by 90° with respect to the longitudinal direction is regarded as the transverse direction.

As is well known, strip-shaped materials such as for example paper, aluminum, plastic as used and laminated in a composite material 1, usually have different characteristics in different directions (machine direction or longitudinal direction and transversely thereto) due to characteristics of the manufacturing process. In the case of paper, this is for example a consequence of the fiber arrangement of the paper fibers due to the manufacturing process. In the case of aluminum the different characteristics result, for example, from the rolling direction, and in the case of plastics they result, for example, from the usual stretching. Although the laminating layer 4 is isotropic with regard to the characteristics, nevertheless different characteristics are accordingly produced in the composite material 1 in various directions, in particular different bending stiffnesses, in the longitudinal direction and the transverse direction.

For setting the required bending stiffness B of the composite material 1 by means of the mixing ratio M of the two different adhesives in the laminating agent, it is possible for example to apply a series of tests for a specific composite material 1 (number of plies, material of the plies, thicknesses of the plies, thickness of the laminating layer 4) and to measure the bending stiffness B for different mixing ratios M. The general relationship applies, that the bending stiffness B of the composite material 1 decreases as more second, non-curing adhesive is added. This is described by way of example with reference to the following exemplary embodiments.

For a specific first exemplary embodiment a commercially available first, curing adhesive in the form of an adhesive containing a styrene butadiene having the product name LANDOCOL 7185 from the company Svenska Lim AB and a commercially available second, non-curing adhesive in the form of an adhesive containing polyacrylate having the product name AQUENCE ENV 1626-24 from the company Henkel were mixed in specific mixing ratios M (based on the adhesive masses) as an aqueous solution. The composite material 1 was a two-ply aluminum/paper (laminating silk) composite, having an aluminum thickness of 7.8 μm and a laminating silk with a grammage of 20 g/m². The laminating agent was applied in each case with a grammage of 0.7 g/m². For the measurement of the bending stiffness B a sample of the composite material with a width b of 15 mm was used. The distance I of the point of application of force from the clamp was chosen to be 1 mm. The bending stiffness B was measured both in the longitudinal direction and also in the transverse direction of the composite material 1. The bending stiffness B was measured at a bending angle α von 30° as bending force $B_F$ in mN. The measurement was carried out at room temperature of approximately 22° C. For each measured value in Table 1 five measurements were made, which were then averaged.

TABLE 1

| | Exemplary embodiment 1 | | | |
|---|---|---|---|---|
| | | | Bending stiffness B (here bending force $B_F$ [mN]) | |
| | | Second adhesive | | |
| Mixing ratio | First adhesive Landocol 7185 | Aquence ENV 1626-24 | Longi-tudinal | Transverse |
| M1 | 0% | 100% | 56 | 82 |
| M2 | 20% | 80% | 66 | 80 |

TABLE 1-continued

Exemplary embodiment 1

| Mixing ratio | First adhesive Landocol 7185 | Second adhesive Aquence ENV 1626-24 | Bending stiffness B (here bending force $B_F$ [mN]) | |
|---|---|---|---|---|
| | | | Longi-tudinal | Transverse |
| M3 | 50% | 50% | 84 | 103 |
| M4 | 62.5% | 37.5% | 102 | 121 |

The above table demonstrates unambiguously the influence of the mixing ratio M on the resulting bending stiffness B of the composite material 1. In particular it also shows that the bending stiffness B of the composite material 1 decreases if more second, non-curing adhesive is present in the laminating agent.

In a second exemplary embodiment the glue Loctite Liofol LW 9112 from Henkel used as first, curing adhesive was mixed with AQUENCE ENV 1626-24 as second, non-curing adhesive. Otherwise the composition of the composite material 1 and the measuring method are the same as in the first exemplary embodiment.

TABLE 2

Exemplary embodiment 2

| Mixing ratio | First adhesive Loctite Liofol LW 9112 | Second adhesive Aquence ENV 1626-24 | Bending stiffness B (here bending force $B_F$ [mN]) | |
|---|---|---|---|---|
| | | | Longi-tudinal | Transverse |
| M1 | 62.5% | 37.5% | 102 | 121 |
| M2 | 100% | 0% | 109 | 126 |

Therefore for a certain composite material 1 the required bending stiffness B can be set over such a test series by means of the mixing ratio M. Thus of course in the same way the bending stiffness B of a composite material 1 having more than two plies 2, 3 and also for a composite material having a laminate as first and/or second ply 2, 3 can be set.

For the use of the composite material 1 in the packaging industry for food products the following ranges of the bending stiffness B are particularly interesting: Longitudinally from 50 to 100 mN and transversely from 90 to 120 mN (measured by the method as described in the exemplary embodiment 1).

By means of infrared spectroscopy and, if applicable, with additional thermogravimetric analysis or microcalorimetric analysis, by means of a given composite material 1 a conclusion may also be reached as to whether a mixture of two adhesives according to the present teaching is present in a laminating layer 4 and as to the mixing ratio M in which these adhesives have been mixed.

The invention claimed is:

1. A multi-ply composite material,
   wherein at least a first ply and a second ply are connected to one another by a laminating agent,
   wherein a mixture of a first, curing adhesive and a second, non-curing adhesive is provided as the laminating agent,
   wherein a bending stiffness of the composite material is in the range from 50 to 100 mN in the longitudinal direction of the composite material and in the range from 90 to 120 mN in the transverse direction of the composite material, the bending stiffness set by a mixing ratio of the two adhesives.

2. The multi-ply composite material according to claim 1, wherein the mixing ratio is set between the two adhesives in the range from 10% of first, curing adhesive to 90% of second, non-curing adhesive up to 90% of first, curing adhesive to 10% of second, non-curing adhesive.

3. The multi-ply composite material according to claim 1, wherein the first ply and/or the second ply is a ply made of paper, aluminum or plastic, or a ply consisting of a laminate made of paper, aluminum and/or plastic.

4. The multi-ply composite material according to claim 1, wherein the bending stiffness of the composite material declines as more second, non-curing adhesive is added.

5. A method for producing a multi-ply composite material, comprising
   connecting at least a first ply and a second ply to one another by means of a laminating agent wherein a first, curing adhesive and a second, non-curing adhesive are mixed as the laminating agent and
   setting a bending stiffness of the composite material in the range from 50 to 100 mN in the longitudinal direction and in range from 90 to 120 mN in the transverse direction of the composite material by means of a mixing ratio of the two adhesives.

6. The method according to claim 5, wherein the mixing ratio is set between the two adhesives in the range from 10% of first, curing adhesive to 90% of second, non-curing adhesive up to 90% of first, curing adhesive to 10% of second, non-curing adhesive.

7. The method according to claim 5, wherein the bending stiffness of the composite material declines as more second, non-curing adhesive is added.

* * * * *